US012668760B2

(12) United States Patent
Adams et al.

(10) Patent No.: US 12,668,760 B2
(45) Date of Patent: Jun. 30, 2026

(54) MACHINE DISHWASHER CAPSULE WITH THREE COMPARTMENTS

(71) Applicant: Conopco Inc., Englewood Cliffs, NJ (US)

(72) Inventors: Amanda Jane Adams, Bebington (GB); Alexandre François Boux De Casson, Bebington (GB); Marina Mixtro Serrasqueiro, Bebington (GB)

(73) Assignee: Conopco Inc., Englewood Cliffs, NJ (US)

( * ) Notice: Subject to any disclaimer, the term of this patent is extended or adjusted under 35 U.S.C. 154(b) by 499 days.

(21) Appl. No.: 17/642,745

(22) PCT Filed: Jul. 27, 2020

(86) PCT No.: PCT/EP2020/071111

§ 371 (c)(1),
(2) Date: Mar. 14, 2022

(87) PCT Pub. No.: WO2021/063560

PCT Pub. Date: Apr. 8, 2021

(65) Prior Publication Data

US 2022/0325210 A1 Oct. 13, 2022

(30) Foreign Application Priority Data

Sep. 30, 2019 (EP) .................................... 19200470

(51) Int. Cl.
*C11D 17/00* (2006.01)
*C11D 17/04* (2006.01)

(52) U.S. Cl.
CPC .................................. *C11D 17/045* (2013.01)

(58) Field of Classification Search
CPC .................................................... C11D 17/045
See application file for complete search history.

(56) References Cited

U.S. PATENT DOCUMENTS 10,059,912 B2 8/2018 Cooley et al.
2002/0086806 A1* 7/2002 Giblin ................ B65D 75/5822 510/296
2007/0241022 A1 10/2007 Denone et al.
2015/0275153 A1 10/2015 Murphy
2016/0068285 A1* 3/2016 Fowler ................... B65D 65/46 53/558

(Continued)

FOREIGN PATENT DOCUMENTS

CN 114449936 5/2022
EP 0723577 9/1998
EP 1375637 1/2004

(Continued)

OTHER PUBLICATIONS

Euipo RCD file information 0060832590001; 2019; 1-3.
Euipo RCD file information 0067606250001; 2019; 1-3.

*Primary Examiner* — Necholus Ogden, Jr.
(74) *Attorney, Agent, or Firm* — Ipsilon USA-NLO

(57) ABSTRACT

A laundry or machine dish wash product capsule comprising a first compartment containing a first component, a second compartment containing a second component, and a third compartment containing a third component, wherein each of the first compartment and second compartment are separated from each other in a sealing plane.

19 Claims, 3 Drawing Sheets

(56) References Cited

U.S. PATENT DOCUMENTS

2016/0130538 A1* 5/2016 Cooley .............. B65D 81/3261
510/277

FOREIGN PATENT DOCUMENTS

| | | | |
|---|---|---|---|
| EP | 1375637 | A1 | 1/2004 |
| EP | 1394065 | | 3/2004 |
| EP | 2213717 | | 8/2010 |
| EP | 2213717 | A1 | 8/2010 |
| EP | 2857486 | | 4/2015 |
| EP | 2857486 | A1 | 4/2015 |
| RU | 2645671 | | 2/2018 |
| WO | WO9426859 | | 11/1994 |
| WO | WO9426860 | | 11/1994 |
| WO | 0242408 | A2 | 5/2002 |
| WO | WO0242408 | | 5/2002 |
| WO | 2014170882 | A1 | 10/2014 |
| WO | WO2014170882 | | 10/2014 |
| WO | WO2014202412 | | 12/2014 |
| WO | WO2017222983 | | 12/2017 |
| WO | 2018086834 | A1 | 5/2018 |
| WO | WO2018086834 | | 5/2018 |
| WO | WO2021063560 | | 4/2021 |

* cited by examiner

MACHINE DISHWASHER CAPSULE WITH THREE COMPARTMENTS

FIELD OF THE INVENTION

This invention relates to a capsule comprising three compartments, particularly for use in a domestic dishwashing machine.

BACKGROUND OF THE INVENTION

Multi-compartment water-soluble detergent capsules are typically made with water-soluble film, for example polyvinyl alcohol. The preferred capsule manufacturing process involves thermoforming the film. Thermoforming is a process in which a first sheet of film is subjected to a moulding process to form recesses in the film. The process involves heating the film to soften it, and then applying vacuum to hold the film in the moulds. The recesses are then filled. The capsules are completed by overlaying a second sheet over the filled recesses and sealing it to the first sheet of film around the edges of the recesses to form a flat sealing web.

Each compartment of the multi-compartment water-soluble detergent capsules contains a different part of a cleaning composition and the compartments are connected to each other and separated from one another by at least one flat seal area. One compartment may contain a liquid part of the detergent composition and another compartment a granular part of the composition. One of such detergent capsules has a larger rectangular compartment surrounding a small circular compartment. Another of such detergent capsules shows a two compartment "stacked" capsule having a smaller liquid compartment and a larger powder compartment. Even another detergent capsule shows two thermoformed "capsules" to form a multi-compartment capsule whereby a first "capsule" having at least two smaller liquid compartments joined together with foldable flat seals is then used to seal a larger compartment.

Multi-compartment capsules are suited for delivery of main wash laundry compositions to automatic washing machines and even for hand wash applications. Although a multi-compartment configuration is more difficult to manufacture than a single compartment it may be chosen because components of the detergent composition need to be mixed at point of use and/or have reduced stability when stored together. It may also give the capsule aesthetic appeal because the different compartments can be filled with different coloured contents. In general the formulator would like to keep the number of compartments to a minimum in order to avoid complexity and added cost.

The present application and the proposals herein seek to address one or more of the problems noted above and/or seek to provide improved compartment-capsule arrangements especially in connection with the consumer experience and maintaining capsule integrity.

SUMMARY OF THE INVENTION

In one aspect, the present application provides a machine dishwasher capsule comprising a first compartment containing a first component, a second compartment containing a second component, and a third compartment containing a third component, wherein each of the first compartment, the second compartment and the third compartment are separated from each other in a sealing plane.

Another aspect of the invention provides at least two of the first compartment, the second compartment and the third compartment having different volumes.

Another aspect of the invention provides that each of the first compartment, the second compartment and the third compartment extends at maximum a first distance below the sealing plane. Additionally, the first compartment and the second compartment extend at maximum a second distance above the sealing plane, and wherein the third compartment extends at maximum a third distance above the sealing plane, with the third distance greater that the second distance. Optionally, the first distance and the second distance are substantially equal.

Another aspect of the invention provides a first compartment, a second compartment and a third compartment arranged in a non-overlapping arrangement with respect to a sealing plane.

Another aspect of the invention provides a first compartment, a second compartment and a third compartment configured to stack with an adjacent capsule of the same configuration.

The capsules according to the invention are suitable for use in any application such as machine dishwashing or laundry washing processes. The invention was found especially suitable for application in a machine dishwashing process because this process benefits highly from the option to include benefit agents for washing and rinse cycles in a different compartments.

The machine dishwasher capsule according to the invention comprises a first compartment, a second compartment and a third compartment. The first compartment can contain a first liquid content, the second compartment can contain a second liquid content, and the third compartment can contain a powder content. In other embodiments, the compartments could contain different contents, for example, two powder contents and one liquid content, all liquid contents, etc.

Thermoforming Process

The machine dishwasher capsule is produced by a process of thermoforming. Such a process may advantageously comprise the following steps to form the capsule:

(a) placing a first sheet of water-soluble polyvinyl alcohol film over a mould comprising cavities;

(b) heating and applying vacuum to the film to mould the film into the cavities and hold it in place to form corresponding recesses in the film;

(c) filling the different parts of a detergent composition, each of which may have a different colour/opacity (as well as different treatment function) into the recesses, the parts together forming a full detergent composition;

(d) sealing a second sheet of film to the first sheet of film across the formed recesses to produce a capsule having three compartments separated from each other by a continuous internal sealing web;

(e) cutting between the capsules so that a series of capsules with three compartments are formed, each capsule containing a part of a detergent composition in three compartments (e.g., one larger-sized compartment and two relatively medium-sized compartments).

Sealing can be done by any suitable method, for example heat-sealing, solvent sealing or UV sealing, ultrasound or a combination of any (e.g., two) of these. Particularly preferred is water-sealing. Water sealing may be carried out by applying moisture to the second sheet of film before it is sealed to the first sheet of film to form the seal area.

Capsule

In the context of the invention the terms "wrap" and "film" are used interchangeably. In an embodiment, the entire capsule may be coated or wrapped in a film. The film can be water-soluble film. It is highly preferred that the film is at least partly transparent such that the contents can be seen. This way the consumer does not miss out on the visible cue provided by the first, second and third contents of the capsule. Preferably the entire film is transparent. Optionally there are prints on the film, e.g. pictures, letters and/or words.

The film preferably is a flexible film, contrary to solid, self standing containers. The flexible film preferably surrounds the capsule such that there is little room for any movement of or between compartments.

It will be appreciated that the volume of the film should be such that it does not interfere with placing it in the dispenser of a washing appliance or in a container or packaging.

The film can be made of a water-soluble film material or at least partially water soluble film material. Water-soluble material has the advantage that the multi-component tablet can be directly applied in the washing. The desired degree of solubilisation and strength can be achieved by matching the type of material and its thickness such that the desired solubilisation time is achieved while still maintaining the desired strength. Also, preferably, the film material is deformable under heating conditions.

Water soluble materials which may be used to form the water soluble films are widely disclosed in the literature and include, for example, polyester amides, polyvinyl alcohol, copolymers of vinyl alcohol and methacrylate, polyethylene oxide, alginates, cellulose ethers such as carboxymethyl cellulose and methylcellulose, starches and starch derivatives, gelatin and any combination of these. The film is preferably polyvinyl alcohol film and it is more preferably less than 100 micron thick in the finished capsule.

The compartments are typically thermoformed, a first lower film being heated and then held by vacuum in a mould while the compartments are filled. Powdered and/or granular parts of the composition are preferably filled into one or more compartment(s) before any liquid parts of the composition are filled into the remaining compartment(s). This has the advantage that any spilled solid material can be removed from the liquid compartment(s) and seal areas before the liquid compartment(s) are filled.

In an embodiment of the invention, the machine dishwasher capsule comprises the three compartments.

In an embodiment, a compartment is generally semi-circular in plan view. A straight line portion of the semi-circular compartment is located on a side of the capsule and extends between two adjacent corners of the capsule. Generally semi-circular means that the plan view of the shape is a half or part of a circle. This is achieved by use of a semi-circular mould cross-section for the compartment. The relaxation of the formed capsule once it has been removed from the mould can change the compartment, for example, change a semi-ovaloid cross-section to be nearer to a fully ovaloid cross-section. In any event the cross-section remains substantially uniform because the relaxation is substantially uniform.

In an embodiment, at least one compartment, is generally triangular in plan view, and is located at a corner of the capsule. In some instances, the compartment can span to two or three corners of the capsule if the capsule is square or rectangular. Generally triangular means that the plan view of the shape is triangular in shape, but can, for example, have rounded corners. Alternatively the first compartment and/or the second compartment can be generally polygonal in plan view. These shapes are achieved by use of various mould cross-sections for each compartment.

The sealing area between the first compartment and the second compartment, the second compartment and the third compartment, and the first compartment and the third compartment has a width sufficient to ensure sealing between the compartments, for example, from 0.1 to 3 mm, preferably from 0.1 to 2 mm.

Preferably, the third compartment is larger than each of the first and second compartments.

Each of the first compartment, the second compartment and the third compartment are separated from each other in a sealing plane. This sealing plane is typically at a center of the cross-section of each of the compartments (i.e., they extend above and below the sealing plane a substantially equal distance), though could be off-center in some embodiments (e.g., the maximum distance above the sealing is larger than the maximum distance below the sealing plane). This could be achieved with, for example, different moulds and/or use of different strength films on the top versus the bottom.

Preferably, each of the first compartment, the second compartment and the third compartment extends at a maximum first, second and third distance above the sealing plane, respectively. Each of the first compartment, the second compartment and the third compartment extends at a respective maximum fourth distance below the sealing plane. The third distance is greater than the second distance. In another embodiment, the first distance and the second distance may be substantially equal.

Preferably each compartment has a maximum depth of from 5 to 40 mm, more preferred from 8 to 30 mm, most preferred from 9 to 20 mm.

In an embodiment, a first capsule is stackable with a second capsule, the second capsule being adjacent the first capsule. The first compartment, the second compartment and the third compartment of the first capsule are configured to stack with the adjacent second capsule of the same configuration. This can be through a number of different configurations, for example, through the arrangement of the compartments with respect to each other and/or sealing lines forming a configuration which allow for efficient use of space when stacking. Another configuration could use different maximum distances extending above the sealing plane allowing the compartments to fit together complementary to each other, e.g., the first, the second and the third compartment of the first capsule end in a position of the capsule forming a sort of natural cavity into which a bulge of the largest compartment of the adjacent second capsule fits. The configuration could be for stacking in the same orientation, stacking as pairs and/or staggered, with a first capsule in a first orientation and a second capsule in a second orientation to fit together for efficient use of space when stacking.

An unexpected advantage of this capsule shape has been the way that it seems to automatically take up less volume in a pack due to the shape helping it to form staggered stacks of capsules with minimal wasted space in between. This is achieved by the configuration of the capsule, examples of which are described above. Further embodiments varying the configuration, shape and size of the capsule compartments to form capsules with naturally stacking shapes can be envisaged. In some embodiments, it would even be possible to dispense the capsules from a tube like pack containing a highly efficiently packed single stack of capsules by maximizing the number of capsules required to full a pack containing and further lowering shipping cost. It would also be possible to improve stability during transport even in a flexible plastic containers.

Detergent Composition

Preferably the substrate is any suitable substrate including dishes, where "dishes" is used herein in a generic sense, and encompasses essentially any items which may be found in a dishwashing load, including crockery chinaware, glassware, plasticware, hollowware and cutlery, including silverware, and any other substrate, substrate articles, garments, bedding, towels etc.

The treatment or detergent composition may be any type of treatment composition for which it is desirable to provide a dose thereof in a water-soluble capsule.

The detergent composition may be any type of cleaning composition for which it is desirable to provide a dose thereof in a water-soluble capsule. The capsules contain a plurality of compartments, and typically comprise at least two different parts of the detergent composition. Preferably one part of the detergent composition is particulate; and another is a liquid.

All compartments may be filled with a liquid compound. However, compartments may also be filled with gels, powders or any combination thereof. So, for example, some capsules may have two liquid-containing compartments and a powder-containing compartment, or there may be liquid-gel, gel-powder combinations (each form e.g. liquid, gel, powder in a different compartment).

Suitable detergent compositions that may be split into different components for use in the present invention include those intended for machine dishwashing or laundry (fabric cleaning, softening and/or treatment). Preferred are dishwashing compounds, particularly machine dishwashing compounds.

Sometimes it will be sufficient to only have minor differences between the parts of the detergent composition e.g. color, perfume etc. Often, however, it will be advantageous to have visible differences, for example a clearly different physical form of the detergent composition. In this context suitably one part of the composition in one compartment may, for example, be a solid (e.g. a particulate or powdered formulation) while another part of the composition in another compartment may be a liquid or a semi-solid or a gel.

The machine dishwasher capsules may comprise different parts of a detergent composition which, when combined, make up the full detergent composition. This means that the formulation of each of the parts of the detergent composition is different either in its physical form (e.g., viscosity), its composition or, preferably its colour/opacity.

The machine dishwasher capsule according to the invention may comprise in the three compartments three different parts of a detergent composition which, when combined, make up the full detergent composition. By that is meant that the formulation of each of the parts of the detergent composition is different either in its physical form, its composition or its color. Preferably, the first compartment contains a first liquid content, the second compartment contains a second liquid content, and the third compartment contains a powder or granule content.

The compartments of the capsule will be filled with the compound. By "filled", it is meant that the compartment contains liquid and possibly also a gas bubble. The possible presence of the gas bubble provides some protection from compression of the compartment due to its compressibility. The gas is preferably air trapped in the compartment during manufacture. Additionally, other compartments may contain a powder.

In an embodiment, a compartment contains a powder compound. Preferably the solid compound has a weight of at least 7 grams, preferable a weight of substantially 10 grams. If reference is made to the composition or weight of the solid compound it is understood that this concerns the total weight and composition of these solid parts. The powder compound contains a powdered or granular part of the detergent composition, most preferably granular. By granular is meant particles generally larger than 200 micron in diameter, preferably even larger than 350 micron diameter.

Compartments may comprise alkalinity sources (e.g. sodium carbonate), builders (e.g. strong builders as MGDA/GLDA and weak builders as citrate), bleaching systems (e.g. sodium percarbonate), bleach activators (e.g. MnCat, TAED), anti-scalants polymers, corrosion inhibitors (e.g. silicate and disilicate), surfactants, perfum, colorant, antifoams, sheeting polymers, enzymes, preservatives, thickening systems, buffer systems, etc.

In machine dishwasher detergent composition, some components are usually present in form of liquids and others are usually in a powder form. By using them on its natural form, the manufacturing process is less energy consuming.

Surfactants

The present detergent composition preferably contains one or more surfactants. Nonionic surfactant compounds may typically be present in a machine dishwasher capsule in an amount from 0.5 to 20 wt % by total weight of nonionic surfactant based on the total weight of the compartment of the capsule composition.

Preferred nonionic surfactants for use in machine dishwasher capsules are low to non-foaming nonionic surfactants containing ethylene oxide and/or propylene oxide residues. Examples of suitable nonionic surfactants for use in the invention are found in the low-to nonfoaming ethoxylated straight-chain alcohols of the Plurafac™ LF series from BASF, the Synperonic™ series from Croda, the Dehypon™ series from BASF, the Genapol™ series from Clariant, the Lutensol™ LF series from BASF, and the Triton™ DF series from Rohm & Haas. Also of interest are the end-capped ethoxylated alcohols available as the SLF 18B series from BASF.

Enzymes

The detergent composition preferably contains at least 0.03 wt. %, more preferably at least 0.05 wt. % and most preferably 0.07-3 wt. % of one or more enzymes.

Examples of enzymes suitable for use in the cleaning compositions of this invention include lipases, cellulases, peroxidases, proteases (proteolytic enzymes), amylases (amylolytic enzymes) and others which degrade, alter or facilitate the degradation or alteration of biochemical soils and stains encountered in cleansing situations so as to remove more easily the soil or stain from the object being washed to make the soil or stain more removable in a subsequent cleansing step. Both degradation and alteration can improve soil removal.

Preferably, the one or more active enzymes contained in the present composition are selected from protease, amylase, cellulase, peroxidase, mannanase, pectate, lyase and lipase.

Builders and Sequestrants

The term "builder" as used herein refers to a material that is capable of removing calcium and/or magnesium ion from aqueous solution by ion exchange, complexation, sequestration and/or precipitation.

The builder or sequestrant material is preferably fully soluble so as to eliminate the possibility of unwanted and unsightly residues on substrates. For that reason Alkali metal aluminosilicates are not favoured.

Typical examples of phosphorus containing inorganic builders, when present, include the water-soluble salts, especially alkali metal pyrophosphates, orthophosphates and polyphosphates. Specific examples of inorganic phosphate builders include sodium and potassium tripolyphosphates, pyrophosphates and hexametaphosphates.

Examples of suitable non-phosphorus water-soluble detergency builders, when present, include carbonate, citrate, zeolite, silicate and aminopolycarboxylic compounds, such as glutamate diacetic acid (GLDA), methylglycine diacetic acid (MGDA), and Trisodium Citrate. Other non-phosphorus water-soluble detergency builders may include inorganic builders as alkali metal carbonate, bicarbonates, sesquicarbonates, borates, silicates, metasilicates, and crystalline and amorphous aluminosilicates, and organic builders as polycarboxylate polymers, such as polyacrylates, acrylic/maleic copolymers, and acrylic phosphonates, monomeric polycarboxylates such as citrates, gluconates, oxydisuccinates, glycerol mono- di and trisuccinates, carboxymethyloxysuccinates, carboxymethyloxymalonates, dipicolinates and hydroxyethyliminodiacetates.

Bleach

The term “bleach component” as used herein refers to substances that are capable of removing coloured stains by oxidizing or reducing the colour components of the stain. The detergent composition of the present invention preferably comprises 7-22 wt. %, more preferably 8-20 wt. % and most preferably 9-18 wt. % of bleach component.

The bleach component employed in the present detergent composition preferably is an oxidizing bleach component. The oxidizing bleach component may suitably comprise a chlorine-, or bromine-releasing agent or a peroxygen compound. Preferably, the bleach component is selected from peroxides (including peroxide salts such as sodium percarbonate), organic peracids, salts of organic peracids and combinations thereof.

More preferably, the bleach component is a peroxide. Examples of peroxides are acids and corresponding salts of monopersulphate, perborate monohydrate, perborate tetrahydrate, and percarbonate. Most preferably, the bleach component is a percarbonate, notably sodium percarbonate.

Organic peracids useful herein include alkyl peroxy acids and aryl peroxyacids such as peroxybenzoic acid and ring substituted peroxybenzoic acids (e.g. peroxy-alpha-naphthoic acid), aliphatic and substituted aliphatic monoperoxy acids (e.g. peroxylauric acid and peroxystearic acid), and phthaloyl amido peroxy caproic acid (PAP).

Bleach Activators

The term “bleach activator” as used herein refers to compounds employed in cleaning compositions to activate the bleaching agent, or bleach component, especially at lower temperatures.

Examples of bleach activators suitable for use in the cleaning compositions of this invention include one or more activators such as peroxyacid bleach precursors. Peroxyacid bleach precursors are well known in the art. As non-limiting examples can be named tetraacetyl ethylene diamine (TAED), sodium nonanoyloxybenzene sulphonate (SNOBS), sodium benzoyloxybenzene sulphonate (SBOBS) and the cationic peroxyacid precursor (SPCC). If desirable, a bleach activator, such as the Macrocyclic Manganese Bleach Catalyst (MnCAT), can be incorporated.

The bleach activator may suitably be present in the composition in the form of a encapsulate, notably an encapsulate that is separate from the bleach particles in order to avoid premature bleach activation.

Further Optional Ingredients

Optional ingredients are, for example, buffering agents, reducing agents, e. g., borates, alkali metal hydroxide and the well-known enzyme stabilisers such as the polyalcohols, e. g. glycerol and borax; crystal-growth inhibitors, threshold agents; perfumes and dyestuffs and the like.

An antifoam material is advantageously included when organic surfactant is present; especially if the detergent composition is primarily intended for use in front-loading drum-type automatic washing machines. Soap is a suitable antifoam.

Glass corrosion inhibitors can prevent the irreversible corrosion and iridescence of glass surfaces in automatic dishwash detergents. The claimed composition may suitably contain glass corrosion inhibitors. Suitable glass corrosion inhibitors can be selected from the group the group consisting of salts of zinc, bismuth, aluminum, tin, magnesium, calcium, strontium, titanium, zirconium, manganese, lanthanum, mixtures thereof and precursors thereof. More preferred are salts of bismuth, magnesium or zinc or combinations thereof. The most preferred are silicate disilicate or combinations thereof. Using silicates helps on reducing the glass corrosion as well as aluminium corrosion over time.

Anti-tarnishing agents may prevent or reduce the tarnishing, corrosion or oxidation of metals such as silver, copper, aluminium and stainless steel. Anti-tarnishing agents such as benzotriazole, methyl benzotriazole or bis-benzotriazole and substituted or substituted derivatives thereof and those described in EP 723 577 (Unilever) may also be included in the composition. Other anti-tarnishing agents that may be included in the detergent composition are mentioned in WO 94/26860 and WO 94/26859. Suitable redox active agents are for example complexes chosen from the group of cerium, cobalt, hafnium, gallium, manganese, titanium, vanadium, zinc or zirconium, in which the metal are in the oxidation state of II, II, IV V or VI.

Capsule Material

The capsule is produced from a water-soluble film comprising polyvinyl alcohol or a polyvinyl alcohol derivative, i.e. a substantially uniform material. Such film materials can for example be produced by a process of blowing or casting. The water-soluble film can also contain plasticizers, antifoams, anti-oxidants, surfactants, perfumes and the like.

Preferably the height (h) of the capsule is 5-40 mm, more preferable 8-30 mm, the most preferable 9-20 mm.

Preferably both the width (w) and the length (I) of the capsule is greater than 20 mm, more preferable greater than 25 mm.

For machine dishwash capsules it is preferred that the capsule has a linear dimension of length and width of suitably ≥20 mm, ≥30 mm. In embodiments the maximum linear dimension is ≤500 mm, suitably ≤40 mm, ≤30 mm. In some embodiments the length is 40 mm and the width is 30 mm.

For example, in the case of embodiments in which the capsule has a polygonal shape with straight sides meeting at vertices, then the maximum height corresponds to the distance between opposing vertices of the polygon. Linear dimensions of width and height are measured as linear dimensions. Thus, the width is the linear measurement in the x direction (along the x axis) using a top plan view of the unit dose, including any outer sealing web. The length is a linear measurement in the y direction (along y axis) using a top plan view of the capsule, including any outer sealing web.

Use of Capsules

The capsules described herein are suitable for use in a substrate treatment method, suitably a machine dish washing or laundry method. Thus, a further aspect of the present invention provides use of capsules as described herein in a method of cleaning, suitably a machine dish washing or laundry method. Suitably the method includes placing the capsule in the drum or dosing drawer or any dosing device of a (dish)washing machine prior to commencement of a wash cycle.

The capsules are particularly suitable for use in dishwashing and (substrate) washing machines amongst other applications. They can also be used in manual dishwashing or laundry operations. In use the capsules are preferably, and conveniently, placed directly into the liquid which will form the wash liquor or into the area where this liquid will be introduced. The capsule dissolves on contact with the liquid, thereby releasing the detergent composition from the separate compartments and allowing them to form the desired wash liquor.

Combinations of Aspects

A number of proposals and aspects are described herein, which proposals and aspects are intended to be combined to achieve improved or cumulative benefits. Thus, any one aspect may be combined with any other aspect. Similarly the optional features associated with any one of the aspects may apply to any one of the other aspects.

DESCRIPTION OF EMBODIMENTS

The invention will now be further described with reference to the following non-limiting embodiments and with reference to the drawings, of which:

Coordinate axes in the x, y and z direction are shown in each figure to assist in the explanation of the relative arrangement of features of the capsule. FIG. 1 and FIGS. 2A-2E are discussed here to aid understanding of the subsequent discussion of the shape and configuration of the capsule with three compartments.

The capsule described herein is especially suitable for application in a machine dishwashing process because this process benefits highly from the option to include benefit agents for the rinse cycle in a second phase, which can be incorporated into the capsule. This means that the capsule includes one or more water soluble ingredients or components which aid in or enhance cleaning dishes, particularly in a dishwashing machine. For example, the components forming the capsule may aid in better cleaning, cleaner appearance after rinsing, minimizing spot or film formation, etc. The capsule is formed of a number of different components, each component for aiding in one or more parts of a dishwashing cycle.

Figure 1:
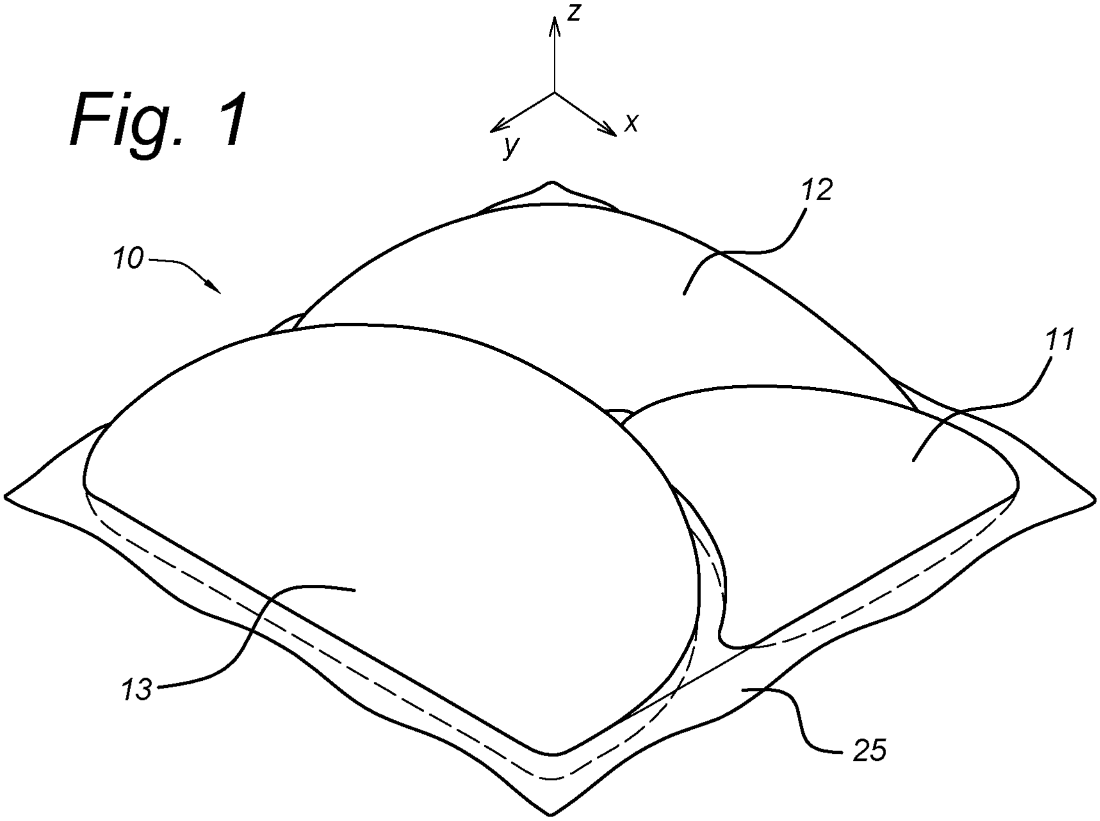
FIG. 1 is a plan view of a machine dishwasher capsule with three compartments according to an embodiment of the current invention.

FIG. 1 shows a perspective view of a machine dishwasher capsule 10 according to the current invention. The machine dishwasher capsule 10 includes a first compartment 11, a second compartment 12 and a third compartment 13. Each of the compartments 11, 12, 13 defines a tight and hermetically sealed chamber containing a part of a detergent composition. The compartments are arranged adjacent one another, as will be described in more detail in relation to FIGS. 2A-2E.

Figure 2A:
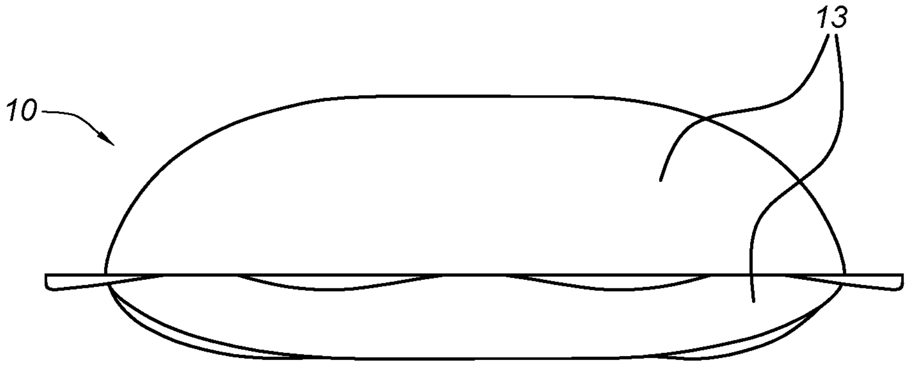
FIG. 2A shows a plan view of the machine dishwasher capsule.
Figure 2B:
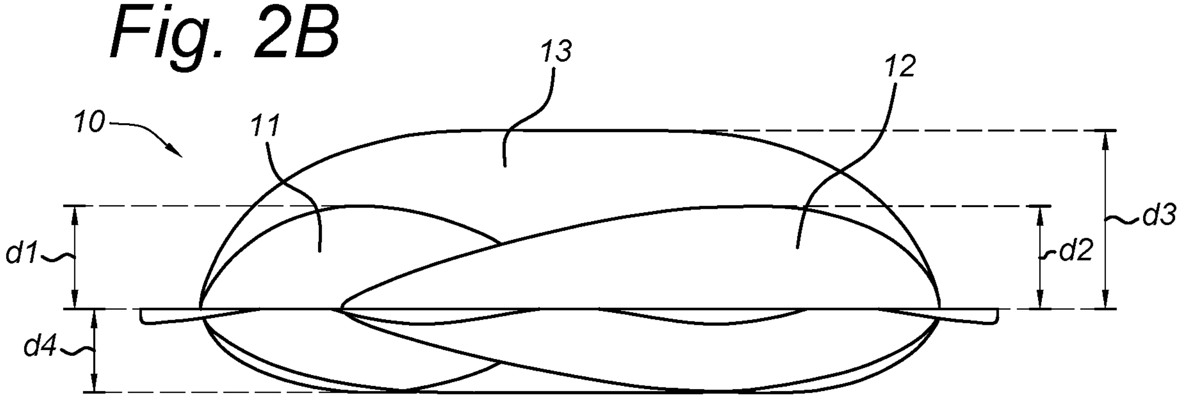
FIG. 2B shows a front view of the dishwasher capsule.
Figure 2C:
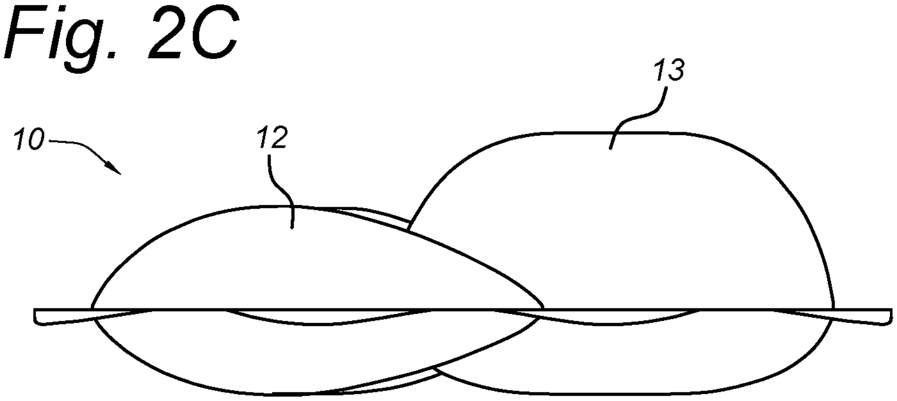
FIG. 2C shows a back side view of a machine dishwasher capsule.
Figure 2D:
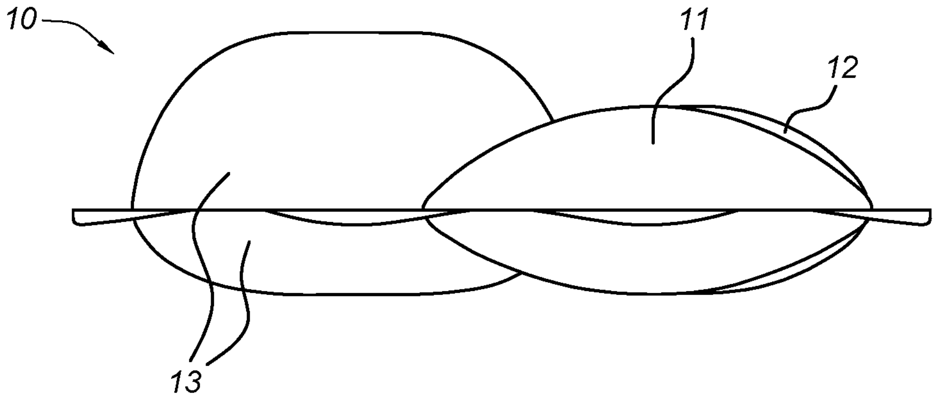
FIG. 2D shows a left side view of a machine dishwasher capsule.
Figure 2E:
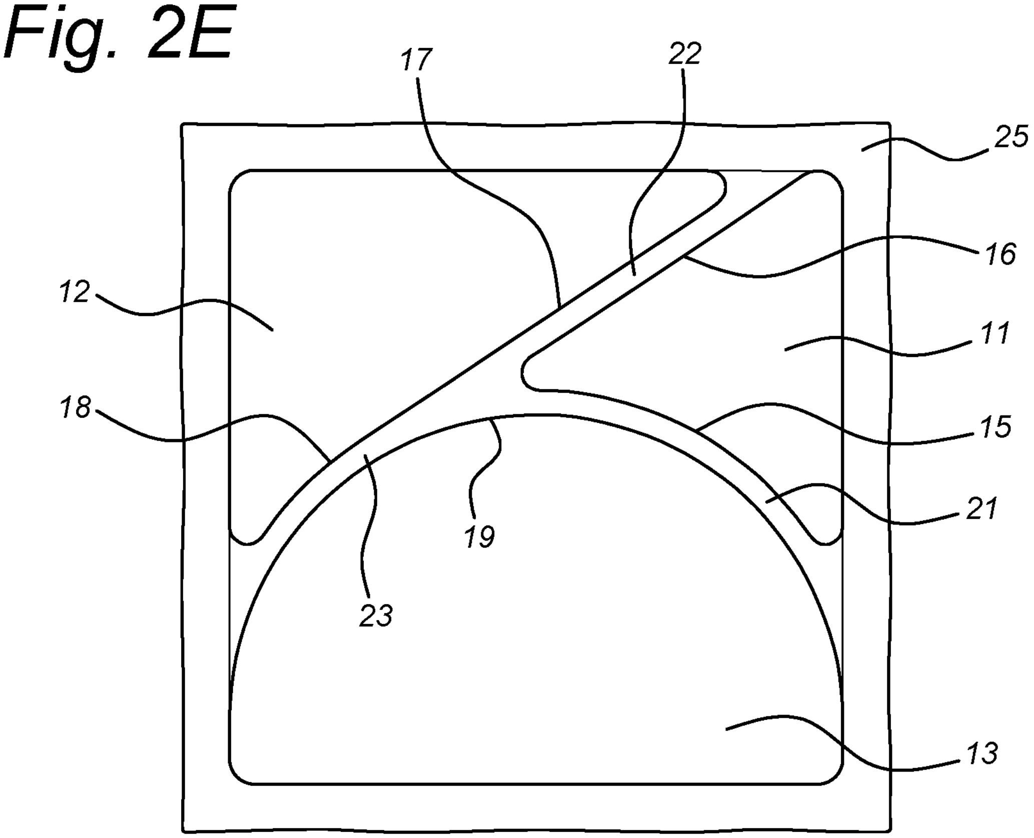
FIG. 2E shows a right view of a machine dishwasher capsule.

FIG. 2A shows a plan view the machine dishwasher capsule 10, FIG. 2B shows a front view of the machine dishwasher capsule 10; FIG. 2C shows a back side view of the machine dishwasher capsule 10; FIG. 2D shows a left side view of the machine dishwasher capsule 10; and FIG. 2E shows a right view of the machine dishwasher capsule 10.

Each compartment 11, 12, 13 of the machine dishwasher capsule 10 is defined between the upper and lower layers of a water-soluble film, and is sealed around its respective periphery by the sealing of the two layers of film around. The upper and lower film layers are also sealed together around the three compartments to form a sealing perimeter 25 extending around all of the compartments 11, 12, 13. In capsule 10, this sealing perimeter 25 forms a square outer edge. Alternatively, other forms may equally be applied for example various shapes composed of curved or straight lines or combinations thereof for example triangle, rectangle, hexagonal, round, square or elliptical to form the sealing perimeter.

The sealing web 20 is formed from fusing, e.g. thermoforming, a first and second sheet of water-soluble film during manufacture of the capsule. The sealing web 20 comprises the sealing perimeter 25 that lies in the x-y plane and is referred to herein as the sealing plane. The linear dimensions of the sealing perimeter 25 define the width and the length of the capsule 10.

Preferable, the maximum linear dimension of the length is 45 mm and the width is 40 mm. Other embodiments could have a linear dimension of length and width of suitably ≥20 mm, ≥30 mm. In some embodiments the maximum linear dimension is ≤50 mm, suitably ≤40 mm, ≤30 mm. In some embodiments, the length and width of the capsule 10 would not be the same, resulting in a rectangular capsule.

In the embodiment shown, each of the three compartments 11, 12, 13 are arranged in a non-overlapping arrangement with respect to the sealing plane, so that it is possible to form the sealing web using only two sheets of water-soluble film. This leads to a low complexity and reduced production cost of the capsule.

The sealing web 20 also comprises three internal sealing webs 21, 22, 23. These are also in the sealing plane and extend across the capsule so as to define the inwardly-facing side edges 15, 16 of the first compartment 11, the inwardly-facing side edges 17, 18 of the second compartment 12 and the inwardly-facing side edge 19 of the third compartment 13. Thus the first compartment 11 and the second compartment 12 are connected to each other, with the internal chambers separated from one another by the first internal sealing web 21; the second compartment 12 and the third compartment 13 are connected to each other, with the internal chambers separated from one another by the second internal sealing web 22; and the first compartment 11 and the third compartment 13 are connected to each other, with the internal chambers separated from one another by the third internal sealing web 23. The internal sealing webs 21, 22, 23 typically separate one compartment from one another by a minimum linear distance defined in the sealing plane of 3 mm or less, preferable 2 mm or less. This can be more or less in some cases depending on the fill of the capsule, components used in the capsule, intended use, etc.

In the embodiment shown, the third compartment 13 is generally semi-circular in the sealing plane, and is located in a side of the capsule 10 of which the outwardly-facing side edge extends between two adjacent corners of the capsule 10.

Figure 3:
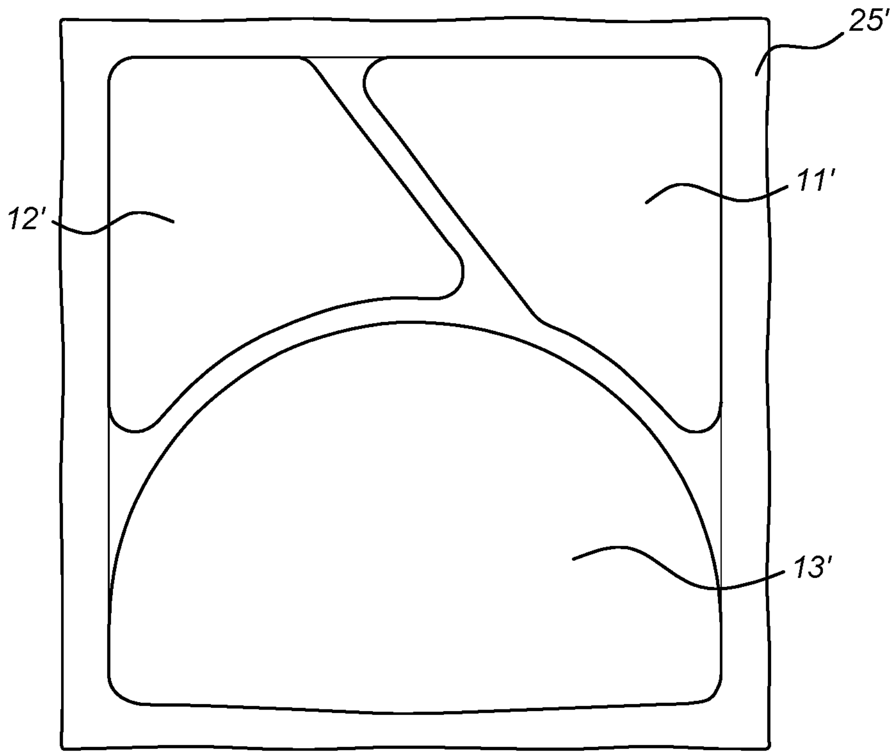
FIG. 3 is a top view of a machine dishwasher capsule with three compartments according to another embodiment.

In the embodiment shown, the at least one of the first compartment 11 and the second compartment 12 are each generally triangular in plan view, and are each located in proximity to at least a corner of the capsule 10. In other embodiments, as shown in FIG. 3, the first compartment 11' and/or the second compartment 12' could be generally polygonal in the sealing plane, preferable a generally four-side polygon.

The second compartment 12 has two outwardly-facing side edges, located on both sides of one corner of the capsule 10, and one inwardly-facing side edge that extends in a first portion generally parallel to the semi-circular side edge of the third compartment 13 and in a second portion generally parallel to one inwardly-facing side edge of the first compartment 11. The first compartment 11 has one outwardly-facing side edge, extending between two adjacent corners of the capsule 10, and two inwardly-facing side edges, one inwardly-facing side edge extending generally parallel to the semi-circular side edge of the third compartment 13 and the other one inwardly-facing side edge extending generally parallel to the inwardly-facing side edge of the second compartment 12.

Reference herein to depth of a feature, or to a feature being, or extending, "above" or "below" is a reference to the dimension (direction, axis) in the z direction, i.e. perpendicular to the sealing plane (x-y plane). Naturally, the terms "above", "below", "up", "down", etc. are relative not absolute terms and they are used accordingly herein, and to aid understanding.

Each of the first compartment 11, the second compartment 12, and the third compartment 13 extends above the sealing plane such that the part of each compartment that is furthermost from the sealing plane, in a direction perpendicular to the sealing plane is referred to herein as the first distance (d1), the second distance (d2), and the third distance (d3), respectively; wherein d1 is ≤20 mm, ≤12 mm, or ≤8 mm; d2 is ≤20 mm, ≤12 mm, or ≤8 mm; and d3 is ≤40 mm, ≤30 mm, ≤20 mm, or ≤12 mm.

Each of the three compartments 11, 12, 13 extends below the sealing plane such that the part of each compartment that is furthermost from the sealing plane, in a direction perpendicular to the sealing plane is referred to herein as the fourth distance (d4), wherein d4 is 5-9 mm.

In the embodiment shown, the third distance (d3) is greater than the first distance (d1) and the second distance (d2). Further the third distance (d3) is greater than the fourth distance (d4). The first distance (d1) is substantially equal to the second distance (d2). The first distance (d1) and the second distance (d2) could differ in some embodiments. The second distance (d2) and the fourth distance (d4) are substantially equal. Other embodiments, could have the second distance (d2) greater than the fourth distance (d4). Further the maximum distance below the sealing plane could differ between compartments in some embodiments.

Each of the compartments 11, 12, 13 of the machine dishwasher capsule 10 contains a part of a machine dishwasher detergent. In the current invention, the first compartment 11 contains a first component 31, the second compartment 12 contains a second component 32, and the third compartment 13 contains a third component 33. The first component 31 is a first liquid content, the second component 32 is a second liquid content and the third component 33 is a powder or granule content. For example, the first liquid content 31 can contain a surfactant and a builder and the second liquid content 32 can contain a surfactant and a polymer.

Hereinafter, the first volume (V1) denotes the detergent volume which can be held in the first compartment 11, the second volume (V2) denotes the detergent volume which can be held in the second compartment 12, and the third volume (V3) denotes the detergent volume which can be held in the third compartment 13.

In the embodiment shown in FIGS. 1-2E, the third compartment 13 is configured to hold a larger volume (V3) of detergent product than each of the first and second compartments 11, 12. The second compartment 12 is configured to hold a larger volume (V2) of detergent composition than the first compartment 11, V3>V2>V1. Other embodiments could have the first and second compartment holding a substantially equal volume, V3>V2=V1, as shown in FIG. 3. Since in machine dishwashing the amounts used of each ingredient can be different, this configuration can improve the distribution or segregation of the detergent in different compartments by filling them with different and varied ingredients. In the case of having the liquid compartments relatively the same volume or liquid dosage, the manufacture process of the capsule can be more efficient. By having the liquid compartments relatively the same volume and next to each other gives the capsule more flexibility and durability than if they were separated by the powder compartment.

Each of the compartments 11, 12, 13 comprises at least one of alkalinity sources, builders, bleaching systems, anti-scalants polymers, corrosion inhibitors, surfactants, anti-foams, sheeting polymers, enzymes, perfume and minor compounds.

The volume of the third compartment 13 is such that the weight of the powder compound is at least 7 grams, preferable 10 grams. Each liquid compound weighs substantially at least 1.5 grams, preferable 2.7 grams. By having the liquid compound a medium weight, that is, a weigh above approximately 2 grams, the compartments containing the liquid compounds can contain a variety of ingredients, as a surfactant, a builder and a polymer.

By forming capsule 10 with first, second and third compartments 11, 12, 13 separated by a sealing plane; capsule 10 is able to deliver three different components to a washing operation in a compact and reliable form. The use of a sealing plane provides for a stable separation of the interior of compartments and results in a flexible capsule that takes up less volume in a package. The compartments 11, 12, 13 are efficiently shaped to ensure proper amounts of components are able to be stored and delivered while minimized the overall size of capsule 10. Providing capsule 10 with three compartments 11, 12, 13 allowing for the use of three different components can result in a more targeted and/or effective cleaning operation than past capsules or tablets that only included one or two components. For example, three separate components targeting a specific situation, e.g., heavy use pots and pans, could be included in capsule 10 making it more effective toward its targeted substrate.

In another embodiment, the capsule 10 is stackable with an adjacent capsule. The first compartment 11, the second compartment 12 and the third compartment 13 of the capsule 10 are configured to stack with the adjacent capsule of the same configuration.

By having different maximum distances (d1, d2, d3) extending above the sealing plane, a natural cavity is formed between the first compartment 11, the second compartment 12 and the third compartment 13. The cavity is located between two planes parallel to and above the sealing plane, a first plane at a distance equal to the third distance (d3) and a second plane at a distance equal to the greatest distance between the first distance (d1) and the second distance (d2). Being the third distance (d3) greater than the first distance (d1) and the second distance (d2), the third compartment 13 sticks out the second plane until the first plane, forming a bulge.

When the cavity of the capsule 10 is stacked with the third compartment bulge of the adjacent capsule, the capsule 10 and adjacent capsule fit together complementary, allowing minimal wasted space in between when stacking. Other considerations, such as the distances of the bulge in each compartment, shape of compartments, size and configuration of sealing lines, etc. can be configured to promote the stacking.

Example of Detergent Composition

An example of the composition of the first liquid content, the second liquid content and the power content is given hereinafter. The configuration of the capsule with segregated compartments improve the stability of ingredients. Further, performance of perfume is better when the perfume is part of the ingredients in at least one of the liquid chambers, i.e. the first liquid content composition or the second liquid content composition.

The first compartment 11 of a machine dishwasher capsule 10, as described by the first liquid content composition below, weighing substantially 2.7 grams.

| Ingredient | wt % |
|---|---|
| Tetrasodium dicarboxymethyl glutamate | 45.43 |
| water | 16.91 |
| Acrylic/sulphonic copolymer | 14.20 |
| Citric acid | 7.49 |
| Non-ionic surfactant | 3.41 |
| Sorbitol | 2.83 |
| Minor ingredients | Up to balance |

A second compartment 12 of a machine dishwasher capsule 11, as described by the second liquid content composition below, weighing substantially 2.7 grams.

| Ingredient | wt % |
|---|---|
| Tetrasodium dicarboxymethyl glutamate | 45.43 |
| water | 16.91 |
| Acrylic/sulphonic copolymer | 14.20 |
| Citric acid | 7.49 |
| Amylase enzyme | 5.30 |
| Non-ionic surfactant | 3.41 |
| Sorbitol | 2.83 |
| Perfume | 0.40 |
| Minor ingredients | Up to balance |

The third compartment 13 of a machine dishwasher capsule 10 comprising a powder content, as described by the composition below, weighing substantially 10 grams.

| Ingredient | wt % |
|---|---|
| Sodium carbonate | 26.00 |
| Sodium percarbonate (bleach) | 23.00 |
| Trisodium Citrate | 11.40 |
| Acrylic/sulphonic copolymer | 5.11 |
| Mixture of TAED and MnCat (bleach catalysis) | 5.00 |
| Protease enzyme | 5.00 |
| Minor ingredients | Up to balance |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A machine dishwasher capsule comprising:

a first compartment containing a first component, a second compartment containing a second component, and a third compartment containing a third component and forming a bulge, wherein each of the first compartment, the second compartment and the third compartment are separated from each other in a sealing plane; and wherein the third compartment is larger than each of the first and second compartments;

wherein the third compartment has a generally semi-circular shape, wherein a straight line portion of the semi-circular compartment is located on a side of the capsule and extends between two adjacent corners of the capsule, wherein a cavity is formed between the first compartment, the second compartment and the third compartment, wherein the first component comprises a first liquid content, the second component comprises a second liquid content and the third component comprises a powder content, and wherein the first compartment, the second compartment and the third compartment are configured to stack with an adjacent capsule of the same configuration such that the cavity is stacked with the third compartment bulge of the adjacent capsule, wherein each of the first component and the second component has a weight of 1.5-2.7 grams, and the third component has a weight of 7-10 grams.

2. The machine dishwasher capsule of claim 1, wherein the first liquid content contains a surfactant and a builder.

3. The machine dishwasher capsule of claim 1, wherein the second liquid content contains a surfactant and a polymer.

4. The machine dishwasher capsule of claim 1, wherein the first and/or second compartments have a generally polygonal shape.

5. The machine dishwasher capsule of claim 1, wherein at least two of the first compartment, second compartment and third compartment have a different volume.

6. The machine dishwasher capsule of claim 1, wherein the capsule is form of water soluble film.

7. The machine dishwasher capsule of claim 1, wherein each of the first compartment, the second compartment and third compartment extends at maximum a first distance, a second distance and a third distance, respectively, above the sealing plane, with the first distance and the second distance being equal, and the third distance greater that the second distance.

8. The machine dishwasher capsule of claim 1, wherein each of the first compartment, the second compartment and the third compartment extends at maximum a fourth distance below the sealing plane.

9. The machine dishwasher capsule of claim 7, wherein the first distance and the fourth distance are equal.

10. The machine dishwasher capsule of claim 1, wherein each of the first compartment, the second compartment and the third compartments are arranged in a non-overlapping arrangement with respect to the sealing plane.

11. The machine dishwasher capsule of any of claim 1, wherein the sealing area between the first compartment and the second compartment, the second compartment and the third compartment, and the first compartment and the third compartment has a width from 0.1 to 3 mm.

12. The machine dishwasher capsule of claim 1, wherein the first and/or second compartments have a generally triangular shape.

13. The machine dishwasher capsule of claim 11, wherein the sealing area between the first compartment and the second compartment, the second compartment and the third compartment, and the first compartment and the third compartment has a width from 0.1 to 2 mm.

14. A machine dishwasher capsule comprising:

a first compartment containing a first component, a second compartment containing a second component, and a third compartment with a generally semi-circular shape with a straight line portion located on a side of the capsule and extending between two adjacent corners of the capsule, the third compartment containing a third component and forming a bulge;

wherein each of the first compartment, the second compartment and the third compartment are separated from each other in a sealing plane; and wherein the third compartment is larger than each of the first and second compartments;

wherein a cavity is formed between the first compartment, the second compartment and the third compartment;

wherein the first compartment, the second compartment and the third compartment are configured to stack with an adjacent capsule of the same configuration such that the cavity is stacked with the third compartment bulge of the adjacent capsule;

wherein each of the first compartment, the second compartment and third compartment extends at maximum a first distance, a second distance and a third distance, respectively, above the sealing plane, and the third distance being greater that the first distance and the second distance.

15. The machine dishwasher capsule of claim 14, wherein the first distance and the second distance are equal.

16. The machine dishwasher capsule of claim 14, wherein the first component comprises a first liquid content, the second component comprises a second liquid content and the third component comprises a powder content.

17. The machine dishwasher capsule of claim 14, wherein the capsule is formed of water soluble film.

18. The machine dishwasher capsule of claim 14, wherein each of the first compartment, the second compartment and the third compartment extends at maximum a fourth distance below the sealing plane, and wherein the fourth distance is less than the third distance.

19. The machine dishwasher capsule of claim 14, wherein each of the first component and the second component has a weight of 1.5-2.7 grams, and the third component has a weight of 7-10 grams.

* * * * *